(No Model.)

G. W. DAVIS & C. L. KINSFATTER.
DEVICE FOR ATTACHING PLUNGERS TO GLASS PRESSES.

No. 346,737. Patented Aug. 3, 1886.

WITNESSES
J. M. Barclay.
R. J. Beatty.

INVENTORS
George W. Davis.
Carle Lorenz Kinsfatter.
R. S. & A. P. Lacey, Attys

UNITED STATES PATENT OFFICE.

GEORGE W. DAVIS AND CARLE L. KINSFATTER, OF STEUBENVILLE, OHIO.

DEVICE FOR ATTACHING PLUNGERS TO GLASS-PRESSES.

SPECIFICATION forming part of Letters Patent No. 346,737, dated August 3, 1886.

Application filed May 6, 1886. Serial No. 201,407. (No model.)

*To all whom it may concern:*

Be it known that we, GEORGE W. DAVIS and CARLE L. KINSFATTER, citizens of the United States, residing at Steubenville, in the county of Jefferson and State of Ohio, have invented certain new and useful Improvements in Devices for Attaching Plungers to Glass-Presses; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in the method of attaching plungers to glass-presses; and it consists in the peculiar construction and arrangement of the several parts, hereinafter fully described, and specifically pointed out in the claims.

Figure 1:
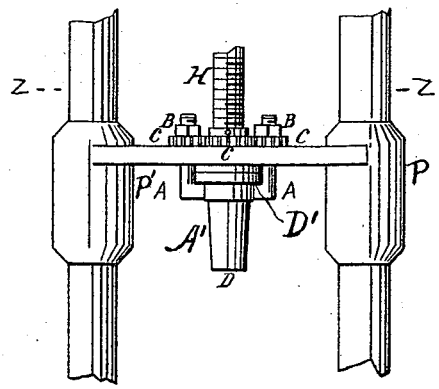
Figure 2:
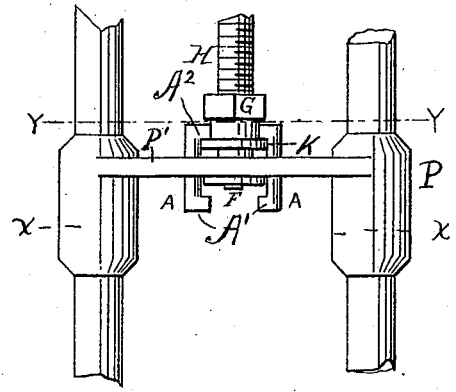
Figure 3:
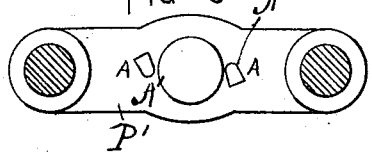
Figure 4:
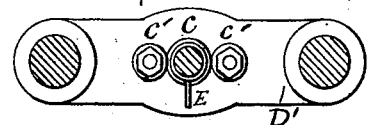
Figure 5:
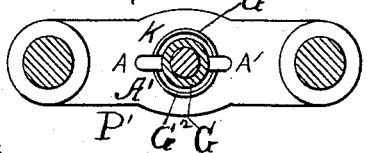
Figure 7:
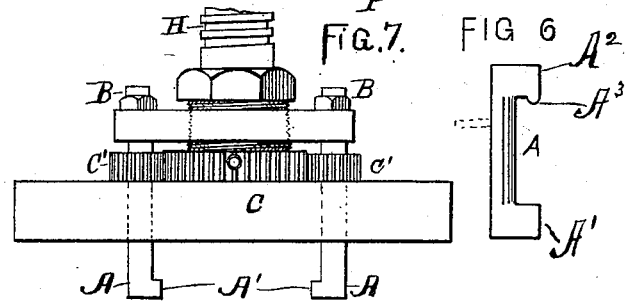
Figure 6:
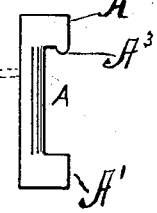

In the drawings, Figure 1 is a side elevation of the piston-head with the improvements attached thereto, and having the plunger in position. Fig. 2 is a side elevation of the piston-head, the plunger and gearing being removed, and showing the ends of the draw-bolts extended upward and engaged on a flanged and grooved nut on the lower end of the piston. Fig. 3 is a plan of the under side of the cross-bar of the piston-head on line X X, Fig. 2. Fig. 4 is a section on line Z Z, Fig. 1. Fig. 5 is a section on line Y Y, Fig. 2; and Fig. 6 is a detail of one of the rotating draw-bolts shown in Fig. 2. Fig. 7 is an enlarged side view of the cross-bar embodying the features shown in Figs. 1 and 2.

P is the piston-head, having the cross-bar P' and threaded piston H, all of ordinary construction. A guide, F, is provided to hold the plunger in center. A loose gear-wheel, C, is placed on the lower end of the piston, and it meshes with the two gears C' C', placed on the shanks of and adapted to turn the draw-bolts A A.

The gears C' C' are not fixed rigidly in position on the shanks of the draw-bolts, but are held by a spline and feather or other suitable means, so as to permit the said bolt to have a slight vertical movement.

The central gear-wheel, C, is provided with a short lever, E, by which it can be turned to the right or left, and thereby turn the other gears, C' C', and the draw-bolts A A.

The plunger D is provided on its upper end or head with a rim, D', projected outward in a horizontal plane, so as to provide a straight horizontal shoulder, on which the draw-bolts engage. Each draw-bolt is provided with a horizontal arm, A', on its lower end, adapted to be turned under and engage on the under side of the rim D' on the plunger. The shank of the bolt passes upward through and turns readily in an opening in the cross-bar.

In Fig. 1 the draw-bolts are threaded on their upper ends and provided with nuts B B, by which they are drawn upward.

In Fig. 2 a large nut, G, is placed on the threaded piston, as shown. This nut is provided with a rim, G', which is adapted to be engaged by an upper arm, $A^2$, of a draw-bolt made as shown in Fig. 6. Very good results would be attained by having the upper arm, $A^2$, made straight, like the lower arm, A', and having the rim or flange G' straight on its upper side; but much better results are attained by forming a circumferential channel, $G^2$, in the upper side of the flange, G', and providing the arm $A^2$ with a depending lug or tongue, $A^3$, which engages in said channel.

In Fig. 2 the gears C C' are not shown; but it will be understood that they can be placed in like positions, as shown in Fig. 1, the two features being combined, as shown in Fig. 7.

It is not intended that the invention shall be limited by gearing as a means for turning the draw-bolts into or out of engagement with the plunger. The said bolts could be provided with a short lever, as shown in dotted lines, Fig. 6, or they could have their shanks made with an angular section, so that they could be taken hold of by a wrench or other suitable tool. The gearing is the preferable means, because of the rapidity and ease with which it may be operated.

In the operation of the device the draw-bolts are first turned outward, as shown in Fig. 3, the plunger is put in position, the draw-bolts are turned to engage the arms under the rim D', and then the said bolts are drawn upward and the plunger is firmly fixed in place.

In Fig. 1 each bolt is drawn up by turning its respective nut B. In Fig. 2 both bolts are drawn simultaneously by the nut G. In Fig. 7 both adjustments are combined, and may be used independently of each other or simultaneously, as desired.

Only two draw-bolts are shown in the drawings. Three or four can be arranged and operated in substantially the same manner as hereinbefore described. The invention is not limited to the use of two bolts.

Instead of nuts, as described, for lifting the draw-bolts, cams could very easily be arranged in position by which the said bolts could be raised; but such construction would require more time to operate it. One great purpose aimed at in this invention is to save time.

Having described our invention, what we claim, and desire to secure by Letters Patent, is—

1. In a device for attaching plungers to glass-presses, the combination, with the piston-head and the plunger, of the draw-bolts removably connected with the one and adjustably connected with the other, and mechanism, substantially as shown and described, for adjusting the bolts, whereby the plunger and head may be readily connected and separated, substantially as set forth.

2. In a device for attaching plungers to glass-presses, the combination, with the piston-head, of the draw-bolts supported in the piston-head with capability of partial rotation, and adapted to grasp and hold the plunger, and mechanism for turning the said draw-bolts, substantially as and for the purposes set forth.

3. In a device for attaching plungers to glass-presses, the combination, with the piston and the rotatable draw-bolts, of gear-wheels arranged on the piston and on the shanks of the draw-bolts, whereby the latter may be partially rotated, and a lever or crank for operating said gears, substantially as and for the purposes set forth.

4. In a device for attaching plungers to glass-presses, the combination, with the piston-head and the plunger having a flange projected at right angles from its upper end, of the vertically-adjustable draw-bolts having rectangular heads or arms on their lower ends adapted to engage the plunger, substantially as and for the purpose set forth.

5. In a device for attaching plungers to glass-presses, the combination, with the piston-head and piston, of a nut placed upon the lower end of the threaded piston and provided with a flange projected outward, as shown, and vertically-movable draw-bolts provided with heads or arms on their lower ends adapted to grasp the plunger, and provided on their upper ends with heads or arms engaging upon the flange on the said nut, substantially as shown, and for the purposes described.

6. In a device for attaching plungers to glass-presses, the combination, with the piston-head and piston, of a nut placed upon the lower end of the threaded piston and provided with a rim or flange having therein a circumferential channel, and the vertically-movable draw-bolts having heads $A^2$, provided with the depending lug or tongue $A^3$, adapted to engage in the circumferential channel in the flange of the said nut, the said draw-bolts being constructed at their lower ends to grasp and draw the plunger into position, substantially as set forth.

In testimony whereof we affix our signatures in presence of witnesses.

GEORGE W. DAVIS.
CARLE L. KINSFATTER.

Witnesses:
ROBERT J. BEATTY,
J. G. WEY,
W. M. MILLER.